United States Patent
Filsfils et al.

(10) Patent No.: US 8,873,409 B2
(45) Date of Patent: Oct. 28, 2014

(54) INSTALLING AND USING A SUBSET OF ROUTES FOR FORWARDING PACKETS

(75) Inventors: Clarence Filsfils, Brussels (BE); David J. Tsiang, Menlo Park, CA (US); John H. W. Bettink, San Jose, CA (US); Mohammed Ismael Tatar, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 151 days.

(21) Appl. No.: 13/221,144

(22) Filed: Aug. 30, 2011

(65) Prior Publication Data

US 2013/0051392 A1 Feb. 28, 2013

(51) Int. Cl.
*H04L 12/28* (2006.01)
*H04L 12/751* (2013.01)
*H04L 12/715* (2013.01)
*H04L 12/745* (2013.01)
*H04L 12/741* (2013.01)

(52) U.S. Cl.
CPC ............. *H04L 45/025* (2013.01); *H04L 45/748* (2013.01); *H04L 45/54* (2013.01); *H04L 45/04* (2013.01)
USPC ............ 370/252; 370/389; 370/392; 370/419

(58) Field of Classification Search
USPC ............ 370/395.31, 252, 254, 352, 351, 238, 370/395.32, 392, 401, 469; 709/222, 229
See application file for complete search history.

(56) References Cited

U.S. PATENT DOCUMENTS

| 7,826,369 | B2 | 11/2010 | Filsfils et al. |
| 8,149,713 | B2 | 4/2012 | Sun et al. |
| 2002/0078196 | A1* | 6/2002 | Kim et al. ................... 709/224 |
| 2006/0140136 | A1 | 6/2006 | Filsfils et al. |
| 2006/0153200 | A1 | 7/2006 | Filsfils et al. |
| 2009/0041019 | A1* | 2/2009 | He et al. ..................... 370/392 |
| 2009/0103538 | A1* | 4/2009 | Yoshimi .................... 370/392 |
| 2009/0257439 | A1 | 10/2009 | Xu |
| 2011/0075680 | A1 | 3/2011 | Sun et al. |
| 2013/0010796 | A1* | 1/2013 | Judge et al. ................ 370/392 |

FOREIGN PATENT DOCUMENTS

EP 2254284 A1 11/2010

OTHER PUBLICATIONS

PCT International Search Report and the Written Opinion of the International Searching Authority for PCT Application PCT/US2012/051771 (which claims priority to U.S. Appl. No. 13/221,144), ISA/EP, mailed Dec. 10, 2012 (eleven pages).

\* cited by examiner

*Primary Examiner* — Kibrom T Hailu
*Assistant Examiner* — Zewdu A Beyen
(74) *Attorney, Agent, or Firm* — The Law Office of Kirk D. Williams (57) ABSTRACT

In one embodiment, an Internet Protocol (IP) routing information base of a packet switching device is filtered to produce a significantly smaller subset of IP routes that are installed in one or more forwarding information bases for forwarding of IP packets. In one embodiment, these smaller forwarding information bases are located in memory local to a network processor to more quickly perform lookup operations thereon. In one embodiment, one or more of these forwarding information bases is used only for exact matching of addresses (not longest prefix matching). In one embodiment, the IP routes in these smaller forwarding information bases substantially correspond to packet switching devices in a network (e.g., core and edge routers), such as in contrast to including all the IP routes for devices external to the network.

20 Claims, 8 Drawing Sheets

INSTALLING AND USING A SUBSET OF ROUTES FOR FORWARDING PACKETS

TECHNICAL FIELD

The present disclosure relates generally to communicating information with a remote device over a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Accordingly, the ability to provide communications mechanisms and methodologies that allow greater bandwidth, achieve superior performance, and/or offer minimal delay presents a significant challenge for designers of packet switching devices and network managers.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

I. Overview

Disclosed are, inter alia, methods, apparatus, computer-storage media, mechanisms, and means associated with installing and using a subset of routes for forwarding packets. One embodiment includes one or more packet switching devices, and/or one or more packet switching devices configured to operate, or actually operating, in a network.

One embodiment includes a network, comprising: a core network, including a plurality of core packet switching devices, with each of the plurality of core packet switching devices configured to perform operations; and a plurality of edge packet switching devices, with each of the plurality of edge packet switching devices configured to perform operations, including communicating packets with the core network, and with one or more external networks or devices. As used herein, an external network or device refers to a network or device that is external to a core network, with the core network including core packet switching devices and edge packet switching devices.

The configuration of each of the plurality of core packet switching devices and said configuration of each of the plurality of edge packet switching devices includes exchanging Internet Protocol (IP) routing information in a manner to distribute said IP routing information among the plurality of core packet switching devices and the plurality of edge packet switching devices. In one embodiment, the configuration of each particular core packet switching device of the plurality of core packet switching devices includes: maintaining said IP routing information; filtering said IP routing information to produce a significantly fewer number of IP routes that are installed in one or more forwarding information bases (FIBs) within the particular core packet switching device, wherein said installed IP routes include a plurality of IP routes respectively corresponding to each of the plurality of core packet switching devices and each of the plurality of edge devices; and forwarding packets, based on said one or more FIBs within the particular core packet switching device, to other packet switching devices of the plurality of core packet switching devices and the plurality of edge packet switching devices.

In one embodiment, said installed IP routes consist of the plurality of IP routes respectively corresponding to each of the plurality of core packet switching devices and each of the plurality of edge devices. In one embodiment, the number of said installed IP routes is on the order of magnitude of the sum of the number of the plurality of core packet switching devices and the number of the plurality of edge devices. In one embodiment, the number of said installed IP routes is at least one order of magnitude less than the number of routes in said IP routing information said filtered to produce the significantly fewer number of IP routes that are installed in one or more forwarding information bases (FIBs) within the particular core packet switching device.

In one embodiment, said configuration of the each of the plurality of edge packet switching devices includes: performing a lookup operation on a destination address of a received Internet Protocol (IP) packet to determine an IP address of a different edge packet switching device of the plurality of edge packet switching devices; encapsulating the received packet in an encapsulating IP packet having an IP destination address of the IP address of the different edge packet switching device; and sending the encapsulating IP packet to a neighboring core router.

In one embodiment, said exchanging of IP routing information includes exchanging marked routing protocol packets, including IP routing information for one or more IP routes, with said marking identifying for certain particular routes of said one or more IP routes of said exchanged marked routing protocol packets that the corresponding one or more routes must be installed, and with said marking identifying for certain routing information of said exchanged marked routing protocol packets that the corresponding one or more routes are not required to be installed. In one embodiment, said one or more FIBs, in each identifiable core packet switching device of the plurality of core packet switching devices, includes an exact match FIB and a longest prefix matching FIB; and wherein said configuration of each of the plurality of core packet switching devices includes: installing, in the exact match FIB, said routes that must be installed per said corresponding marking; performing only exact, not longest prefix matches, on the exact match FIB; installing, in the longest prefix matching FIB, said routes that are not required to be installed per said corresponding marking; and performing lookup operations on the longest prefix matching FIB.

In one embodiment, said configuration of each of the plurality of core packet switching devices includes: determining, based on one or more fields of a received first particular packet, to perform a lookup operation in the exact match FIB, and in response, to perform a lookup operation in the exact match FIB to determine how to forward the first particular packet; and determining, based on one or more fields of a received second particular packet, to perform a lookup operation in the longest prefix matching FIB, and in response, to perform a lookup operation in the exact match FIB to determine how to forward the second particular packet.

In one embodiment, said one or more FIBs, in each identifiable core packet switching device of the plurality of core packet switching devices, includes an exact match FIB and a longest prefix matching FIB; and wherein said configuration of each of the plurality of core packet switching devices includes: installing, in the exact match FIB, less than all bits of said routes that must be installed per said corresponding marking; performing only exact, not longest prefix matches, on the exact match FIB; installing, in the longest prefix matching FIB, said routes that are not required to be installed per said corresponding marking; and performing lookup operations on the longest prefix matching FIB.

2. Description

Disclosed are, inter alia, methods, apparatus, computer-storage media, mechanisms, and means associated with installing and using a subset of routes for forwarding packets. One embodiment includes one or more packet switching devices, and/or one or more packet switching devices configured to operate, or actually operating, in a network.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Figure 1:
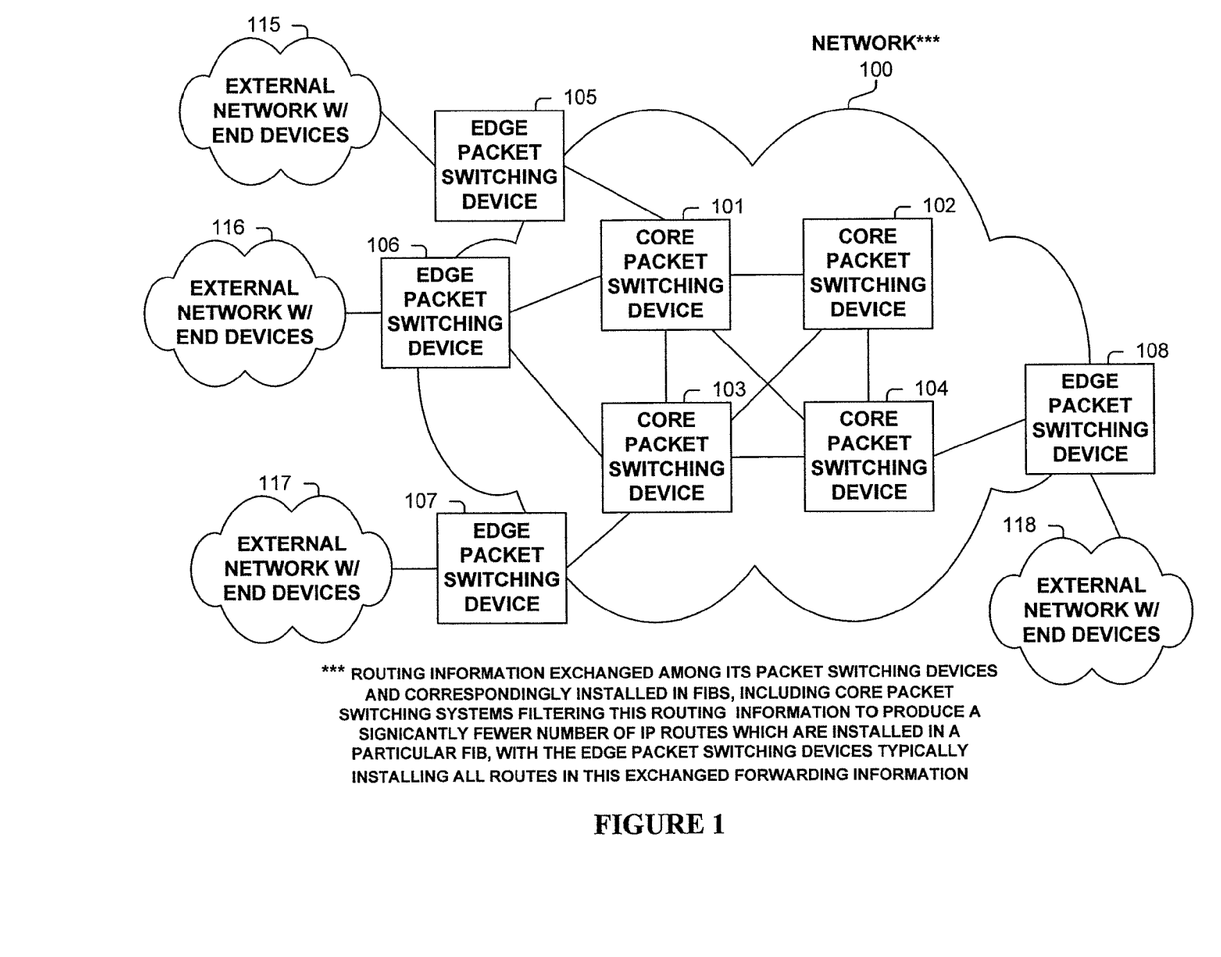
FIG. 1 illustrates a network configured to operate, and/or operating, according to one embodiment.

Expressly turning to the figures, FIG. 1 illustrates a network 100, including one or more or devices 101-108 configured to operate, and/or operating, according to one embodiment. Shown is a typical network configuration of a provider network, with enhancements according to one or more embodiments.

In particular, network 100 includes core packet switching devices 101-104, which operate in the middle or core of network 100. Network 100 also includes edge packet switching devices 105-108, which operate at the edge of network 100 and provide communication connectivity to external networks with end devices (115-118), which typically are customer networks using network 100 to provide network connectivity to other external networks with end devices (115-118).

As edge packet switching devices 105-108 provide routing of packets to exterior networks 115-118, each of edge packet switching devices 105-108 typically needs to be aware of how to route packets to any destination address. To achieve this routing information, each of edge packet switching devices 105-108 and core packet switching devices 101-104 exchange Internet Protocol (IP) routing information in a manner to distribute said IP routing information among the plurality of core packet switching devices 101-104 and the plurality of edge packet switching devices 105-108, such as, but not limited to communicating Interior Gateway Protocol (IGP) and/or Border Gateway Protocol (BGP) routing information packets. Intermediate System-to-Intermediate System (IS-IS) is an Interior Gateway Protocol used in one embodiment. Thus, each of packet switching devices 101-108 have the complete IP routing information for substantially all IP routes. Each of packet switching devices 101-108 typically store this information in a routing information base (RIB), which is a data structure in the control plane of the respective packet switching device 101-108. From there, prior approaches installed all of this IP routing information in forwarding information bases (FIBs) in the data plane (e.g., on line cards for use in forwarding IP packets) in each of packet switching device 101-108.

In contrast, one embodiment filters this IP routing information stored in a core packet switching device 101-104 to produce a significantly fewer number of IP routes that are installed in one or more forwarding information bases (FIBs) within the particular core packet switching device 101-104 for use in forwarding packets. In one embodiment, such filtering is done by another entity. As illustrated by network 100, core packet switching devices 101-104 are not directly coupled to exterior networks 115-118, so core packet switching devices 101-104 effectively only forward packets among core packet switching devices 101-104 and edge packet switching devices 105-108. Therefore, in one embodiment, they do not need to have, nor are their respective FIBs populated with, all of the IP routes. Rather, their respective RIB may be filtered to produce substantially only a subset of IP routes that a core router will actually use in forwarding packets. In one embodiment, another packet switching device, including, but not limited to, an edge or customer packet switching device filters IP routing information to produce a significantly smaller set of routes that are installed in a FIB for forwarding packets. In one embodiment, the significantly smaller set of routes that are installed in a FIB for forwarding packets includes (or consists of) loopback addresses of the core and edge routers of a network.

In one embodiment, this significantly reduced number of installed IP routes is approximately, or is a function of, the number of edge and core packet switching devices in a network. In one embodiment, this significantly reduced number of installed IP routes is on the order of magnitude of the sum of the number of core packet switching devices and the number of edge devices in a network. In one embodiment, this significantly reduced number of installed IP routes is at least one order of magnitude less than the number of routes (e.g., the number of routes in the RIB of a packet switching device) filtered to produce the significantly reduced number of installed IP routes.

Figure 2:
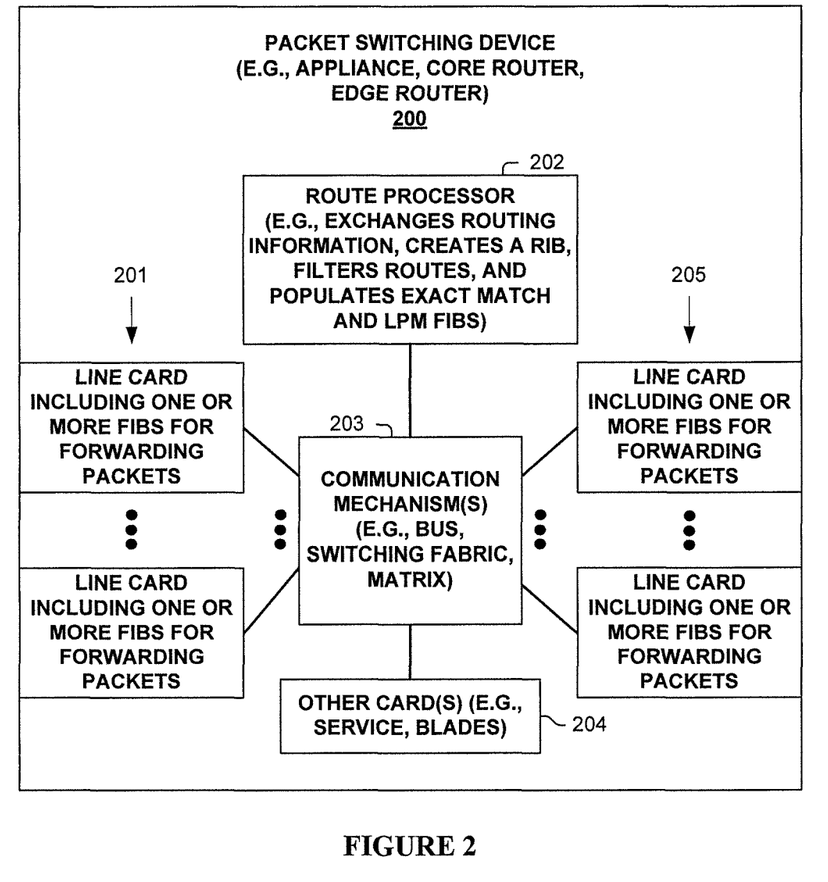
FIG. 2 illustrates a packet switching device configured to operate, and/or operating, according to one embodiment.

One embodiment of packet switching device 200 (e.g., appliance, core router, edge router) is illustrated in FIG. 2. As shown, packet switching device 200 includes line cards 201 and 205, each with one or more FIBs for use in forwarding packets. Additionally, packet switching device 200 also has a route processor 202, which typically manages the control plane by communicating routing information with other packet switching devices, populates one or more RIBs, and populates one or more FIBs in line cards 201 and 205 (with these FIBs possibly including a FIB that is only for exact matching and/or a FIB on which longest prefix matching can be performed). Line card 200 also includes other cards 204 (e.g., service cards, blades), and some communication mechanism 203 (e.g., bus, switching fabric, matrix) for allowing its different entities 201, 202, 204 and 205 to communicate.

Returning to FIG. 1 for reference, in one embodiment, one or more edge packet switching devices 105-108 receive IP packets from external networks 115-118, with these received packets to be forwarded through network 100, typically to a different external network 115-118. In such case in one embodiment, the respective edge packet switching device 105-108 will typically encapsulate the received IP packet in an encapsulating IP packet having a destination address of the edge packet switching device 105-108 from which the received packet is to exit network 100. As such, core packet switching devices 101-104 will typically only be forwarding packets with a destination address of a core packet switching device 101-104 or of an edge packet switching device 105-108, so they do not require the forwarding information for all IP addresses which may be a destination address of a packet received from an external network 115-118. Note, in a transition or static period in which not all of edge packet switching devices 105-108 encapsulate the IP packets in this manner, a core packet switching device 101-104 may forward such a packet to a lookup engine within the core packet switching device 101-104 to perform the lookup operation (e.g., based on the RIB, or one that uses a FIB that has all, or these additional, addresses installed), or perform the lookup in a different FIB that that has all, or at least these additional, addresses installed.

Figure 3A:
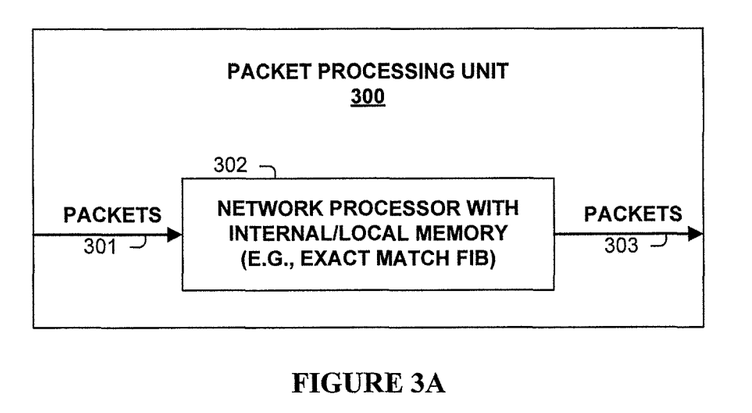
FIG. 3A illustrates a packet processing unit configured to operate, and/or operating, according to one embodiment.

FIG. 3A illustrates a packet processing unit 300, typically included in a line card, for processing packets in a packet switching device in one embodiment. As shown, packet processing unit 300 includes a network processor with internal/local memory 302 that is used for determining how to forward packets based on an IP destination address. (Note, network processor 302 can typically perform other packet processing functionality.) Thus in one embodiment, a packet 301 is received by network processor with internal/local memory 302, and a lookup operation is performed in a FIB stored in this internal/local memory (302) to determine where (and possibly other packet processing information) to forward the packet, which is then forwarded (303).

In one embodiment, the FIB stored in this internal/local memory (302) is an exact match FIB; that is, it is a FIB on which only exact match lookup operations are performed (e.g., not longest prefix matching). For example, a network processor of one embodiment includes a relatively small memory in which thousands to a couple or so hundreds of thousands of exact match entries can be stored in an exact match FIB. By having the memory on-chip or other close coupling (e.g., not an external memory device), the lookup operations in one embodiment are much faster and more efficient than those using a FIB stored in an external memory device. In one embodiment, the FIB stored in this internal/local memory (302) is used to store the significantly fewer number of IP routes produced from the RIB, and not all IP routes stored in the RIB of a packet switching device.

Further, in one embodiment, not all bits of an IP route (including an IPv6 route) are installed in the exact match FIB as, for example, when the high-order bits of the IP addresses of all of the core and edge packet switching devices are the same, then only the low-order bits are determinative. In one embodiment, a subset of the bits of each destination address (e.g., the high-order bits, some other set of bits) are set to a unique value when encapsulating an IP packet in another IP packet (as discussed herein), to provide a mechanism to confirm that a packet switching device in the network encapsulated a received IP packet and addressed the encapsulated IP packet to one of the other packet switching devices in the network. In such a case, a subset of the other bits of the destination address (e.g., the low-order bits, some other set of bits) are unique to a packet switching device in the network.

Figure 3B:
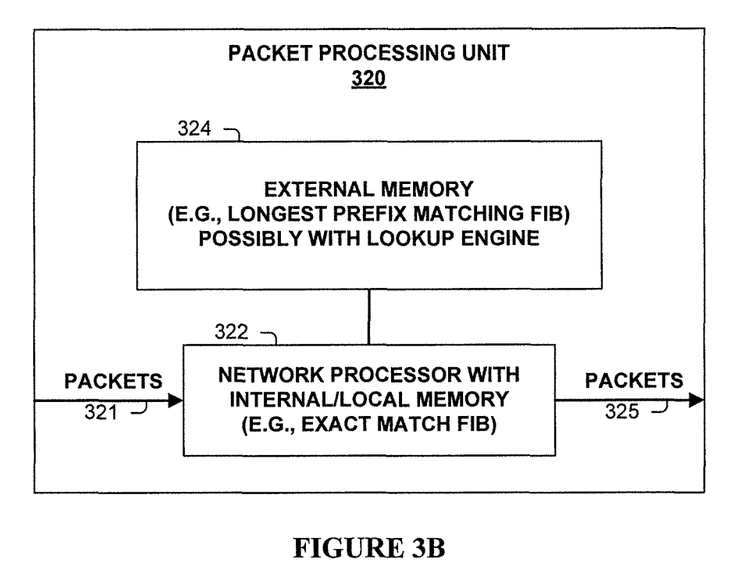
FIG. 3B illustrates a packet processing unit configured to operate, and/or operating, according to one embodiment.

FIG. 3B illustrates a packet processing unit 320, typically included in a line card, for processing packets in a packet switching device in one embodiment. As shown, packet processing unit 320 includes a network processor with internal/ local memory 322 as well as an external memory 324 (e.g., external to a network processor chip or ASIC 322) that is used for determining how to forward packets based on an IP destination address. (Note, network processor 322 can typically perform other packet processing functionality.) Thus in one embodiment, a packet 321 is received by network processor with internal/local memory 322, and a lookup operation is performed in a FIB stored in this internal/local memory (322) or a FIB stored in external memory 324 to determine where (and possibly other packet processing information) to forward the packet, which is then forwarded (323).

In one embodiment, the FIB stored in this internal/local memory (322) is an exact match FIB; that is, it is a FIB on which only exact match lookup operations are performed (e.g., not longest prefix matching). For example, a network processor of one embodiment includes a relatively small memory in which thousands to a couple or so hundreds of thousands of exact match entries can be stored in an exact match FIB. By having the memory on-chip or other close coupling (e.g., not an external memory device), the lookup operations in one embodiment are much faster and more efficient than those using a FIB stored in an external memory device. In one embodiment, the FIB stored in this internal/local memory (322) is used to store the significantly fewer number of IP routes produced from the RIB, and not all IP routes stored in the RIB of a packet switching device.

Further, in one embodiment, not all bits of an IP route (including an IPv6 route) are installed in the exact match FIB as, for example, when the high-order bits of the IP addresses of all of the core and edge packet switching devices are the same, then only the low-order bits are determinative. In one embodiment, a subset of the bits of each destination address (e.g., the high-order bits, some other set of bits) are set to a unique value when encapsulating an IP packet in another IP packet (as discussed herein), to provide a mechanism to confirm that a packet switching device in the network encapsulated a received IP packet and addressed the encapsulated IP packet to one of the other packet switching devices in the network. In such a case, a subset of the other bits of the destination address (e.g., the low-order bits, some other set of bits) are unique to a packet switching device in the network.

In one embodiment, external memory 324 is used to store a FIB including all, substantially all, or the complement of the IP routes that are not stored in internal/local memory (322). Note, longest prefix matching typically requires a much larger memory than that required for exact matching, and/or may use specialized hardware such as a ternary content-addressable memory (or other associative memory) or a lookup engine coupled to a memory in performing the longest prefix matching.

Thus, in one embodiment, packet processing unit 320 includes substantially all IP routes from the RIB, and can more efficiently and quickly perform lookup operations for IP routes stored in the FIB in internal/local memory (322), which are the significantly fewer IP routes produced from filtering the IP routes stored in the RIB.

Figure 4:
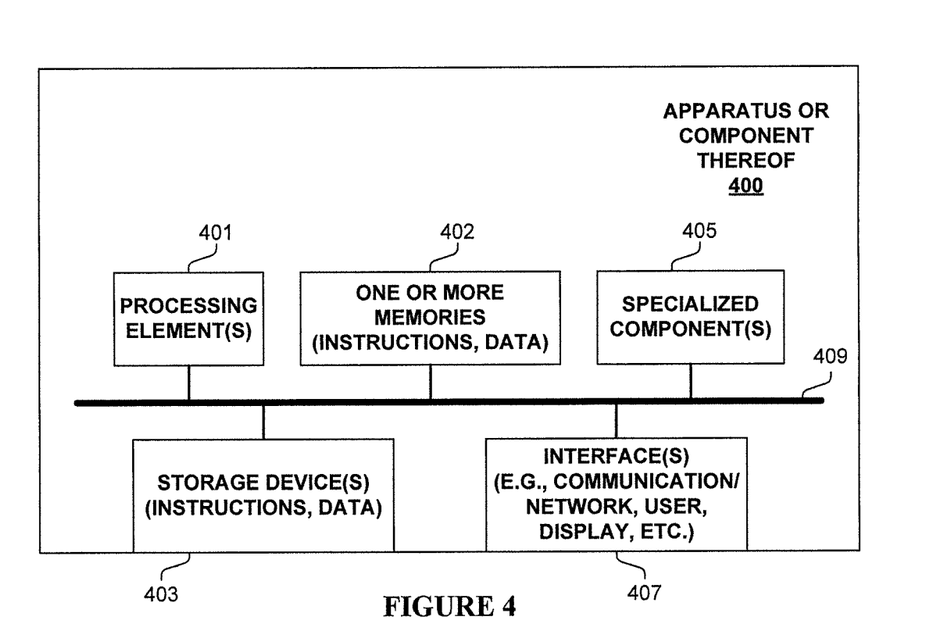
FIG. 4 illustrates an apparatus or component configured to operate, and/or operating, according to one embodiment.

FIG. 4 is a block diagram of an apparatus or component 400 used in one embodiment associated with installing and using a subset of routes for forwarding packets. One embodiment includes one or more packet switching devices, and/or one or more packet switching devices configured to operate, or actually operating, in a network. In one embodiment, apparatus or component 400 performs one or more processes corresponding to one of the flow diagrams illustrated or otherwise described herein, and/or illustrated in another diagram or otherwise described herein.

In one embodiment, apparatus or component 400 includes one or more processing element(s) 401, memory 402, storage device(s) 403, specialized component(s) 405 (e.g. optimized hardware such as for performing operations, etc.), and interface(s) 407 for communicating information (e.g., sending and receiving packets, user-interfaces, displaying information, etc.), which are typically communicatively coupled via one or more communications mechanisms 409, with the communications paths typically tailored to meet the needs of a particular application. In one embodiment, apparatus or component 400 corresponds to, or is part of, a packet switching device 101-108 of FIG. 1.

Various embodiments of apparatus or component 400 may include more or fewer elements. The operation of apparatus or component 400 is typically controlled by processing element(s) 401 using memory 402 and storage device(s) 403 to perform one or more tasks or processes. Memory 402 is one type of computer-readable/computer-storage medium, and typically comprises random access memory (RAM), read only memory (ROM), flash memory, integrated circuits, and/or other memory components. Memory 402 typically stores computer-executable instructions to be executed by processing element(s) 401 and/or data which is manipulated by processing element(s) 401 for implementing functionality in accordance with an embodiment. Storage device(s) 403 are another type of computer-readable medium, and typically comprise solid state storage media, disk drives, diskettes, networked services, tape drives, and other storage devices. Storage device(s) 403 typically store computer-executable instructions to be executed by processing element(s) 401 and/or data which is manipulated by processing element(s) 401 for implementing functionality in accordance with an embodiment.

Figure 5:
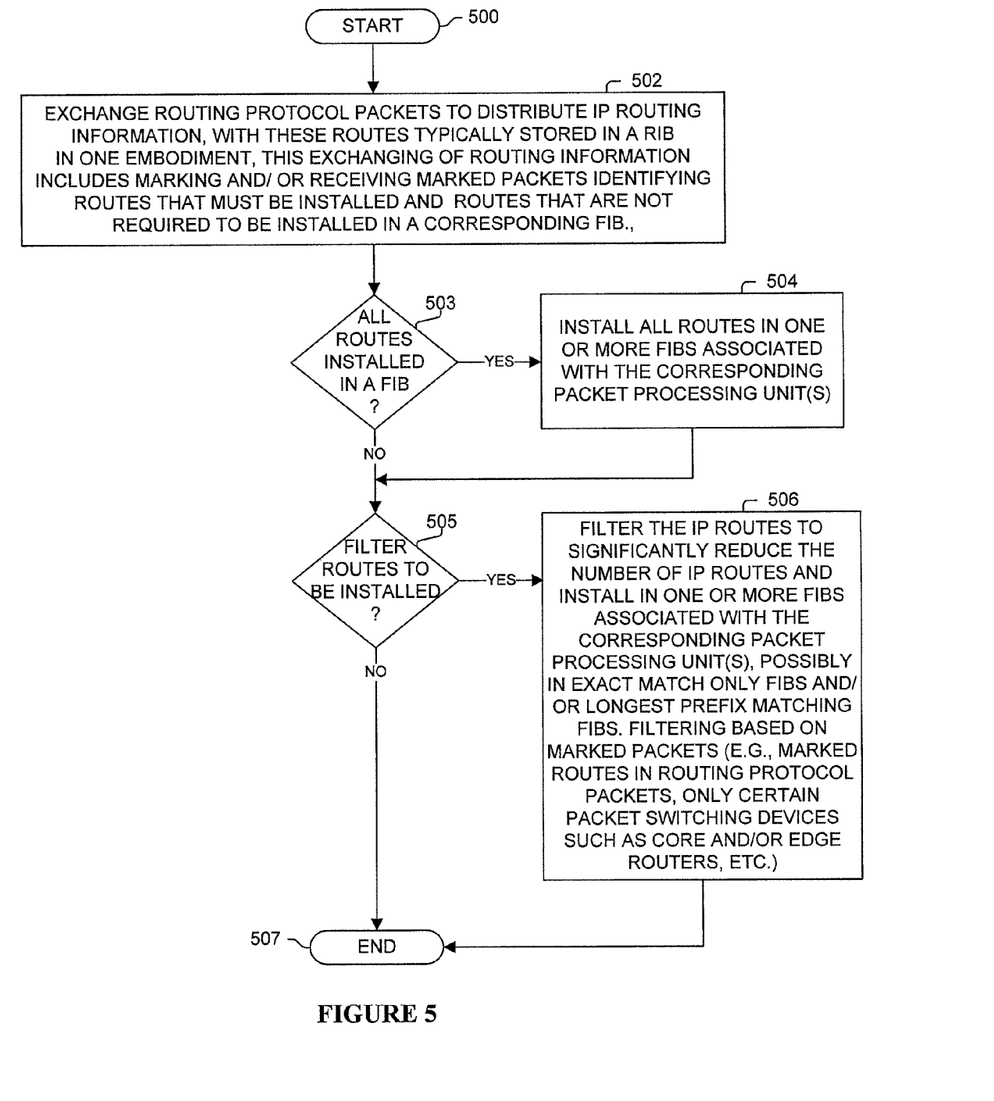
FIG. 5 illustrates a process configured to be performed, and/or performed, in one embodiment.

FIG. 5 illustrates a process configured to be performed and/or performed in one embodiment by a packet switching device. Processing begins with process block 500. In process block 502, routing protocol packets are exchanged with other packet switching devices in the network to distribute IP routing information, with these IP routes typically stored in a RIB.

In one embodiment, this exchanging of routing information includes, but is not limited to including, marking and/or receiving marked packets identifying routes that must be installed and routes that are not required to be installed in a corresponding FIB. For example, in one embodiment, IP routing information is distributed in routing protocol packets using Interior Gateway Protocol (IGP) or Border Gateway Protocol (BGP). Intermediate System-to-Intermediate System (IS-IS) is an Interior Gateway Protocol used in one embodiment. One embodiment uses an extension to flag, or otherwise identify, those IP routes that should or must be installed in a FIB and/or those IP routes that are not required to be installed in a FIB. In one embodiment, these marked packets identify routes corresponding to addresses (e.g., loopback or other addresses) or packet switching devices in the network that are required to be installed in FIBs of core packet switching devices and/or edge packet switching devices. In one embodiment, these marked routes are installed in a FIB stored in memory local or internal to a network processor (e.g., network processor with internal/local memory 302 of FIG. 3A and 322 of FIG. 3B). In one embodiment, those IP routes that should or must be installed in a FIB and/or those IP routes that are not required to be installed in a FIB are configured otherwise, such as via a configuration file, or manually or automatically configured in some manner.

In that context, as determined in process block 503, if all routes are to be installed in one or more FIBs of a packet switching device (which also may have FIBs that store only a significantly fewer number of IP routes), then in process block 504, all of the IP routes are installed in one or more FIBs associated with the corresponding packet processing unit(s).

Next, as determined in process block 505, if a FIB is to be installed with the filtered significantly fewer number of routes, then in process block 506, the IP routing information (typically stored in the RIB) is filtered to produce a significantly fewer number of IP routes that are installed in one or more forwarding information bases (FIBs). In one embodiment, these installed IP routes include IP routes respectively corresponding to each of the core packet switching devices and each of the edge devices in the network. In one embodiment, these significantly fewer number of IP routes are installed in an exact match only FIB, which is typically stored in memory internal or local to a network processor. In one embodiment, the filtering is performed based on IP routes identified in marked routing protocol packets.

Processing of the flow diagram of FIG. 5 is complete as indicated by process block 507.

Figure 6A:
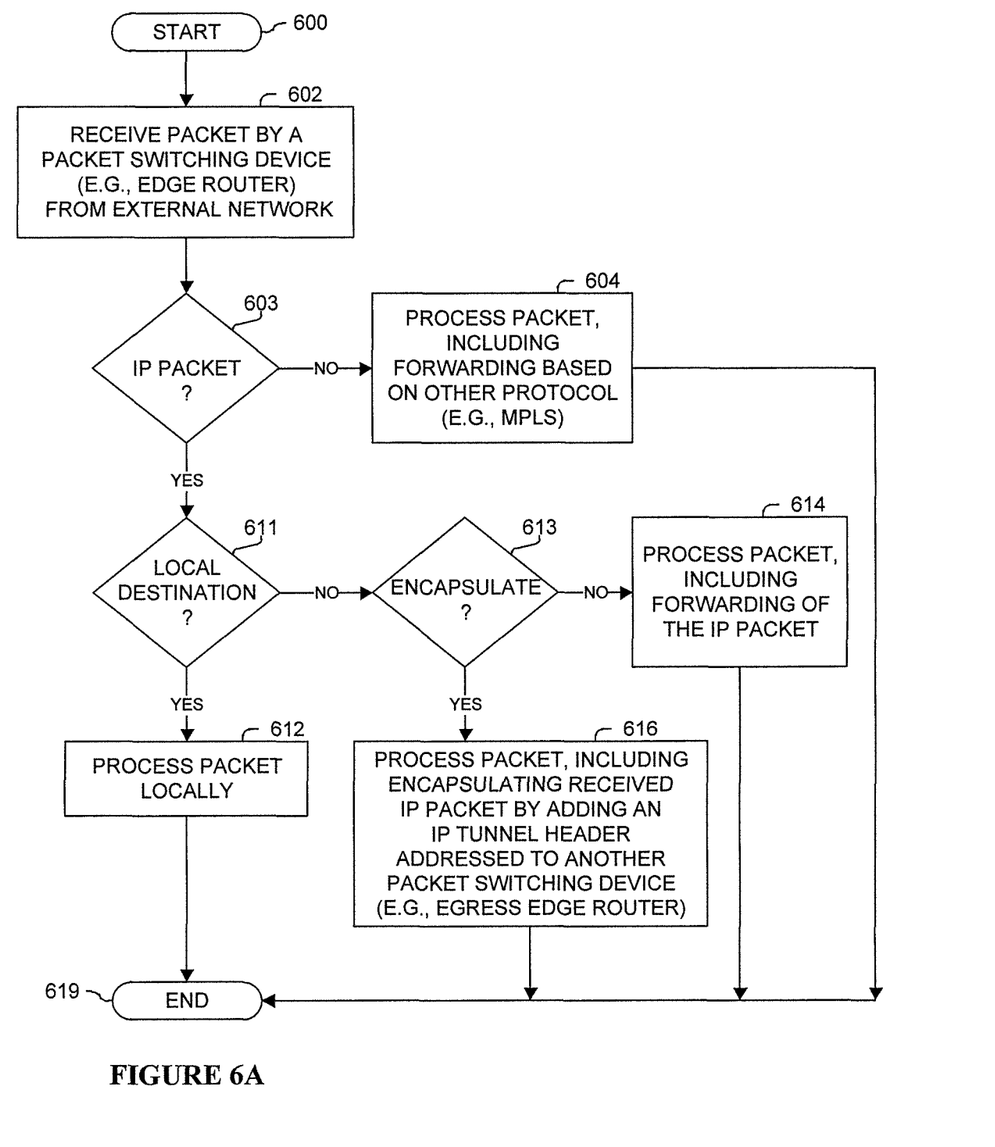
FIG. 6A illustrates a process configured to be performed, and/or performed, in one embodiment.

FIG. 6A illustrates a process configured to be performed and/or performed in one embodiment by a packet switching device, especially an edge packet switching device. Processing begins with process block 600. In process block 602, a packet is received by the edge packet switching device from an external network. As determined in process block 603, if the received packet is not an IP packet, then the packet is processed such as, but not limited to, typically including forwarding based on the other protocol (e.g., MPLS) in process block 604.

Otherwise, if it is determined in process block 603 that the packet is an IP packet, then as determined in process block 611, if the packet is destined for the packet switching device, the packet is processed locally in process block 612.

Otherwise, if it is determined in process block 611 that the packet is not destined for the packet switching device, then as determined in process block 613, if the received packet should not be encapsulated, process flow moves to process block 614, and the received IP packet is processed including forwarding of the IP packet. Otherwise, if it is determined in process block 613 that the received packet is to be encapsulated, then in process block 616, the received IP packet is processed, including encapsulating the received IP packet by adding an IP tunnel header (e.g., LISP, GRE, L2TP, IP in IP) with a destination address of another packet switching device within the network (e.g., an edge packet switching device from which the received IP packet will be sent from the network).

Processing of the flow diagram of FIG. 6A is complete as indicated by process block 619.

Figure 6B:
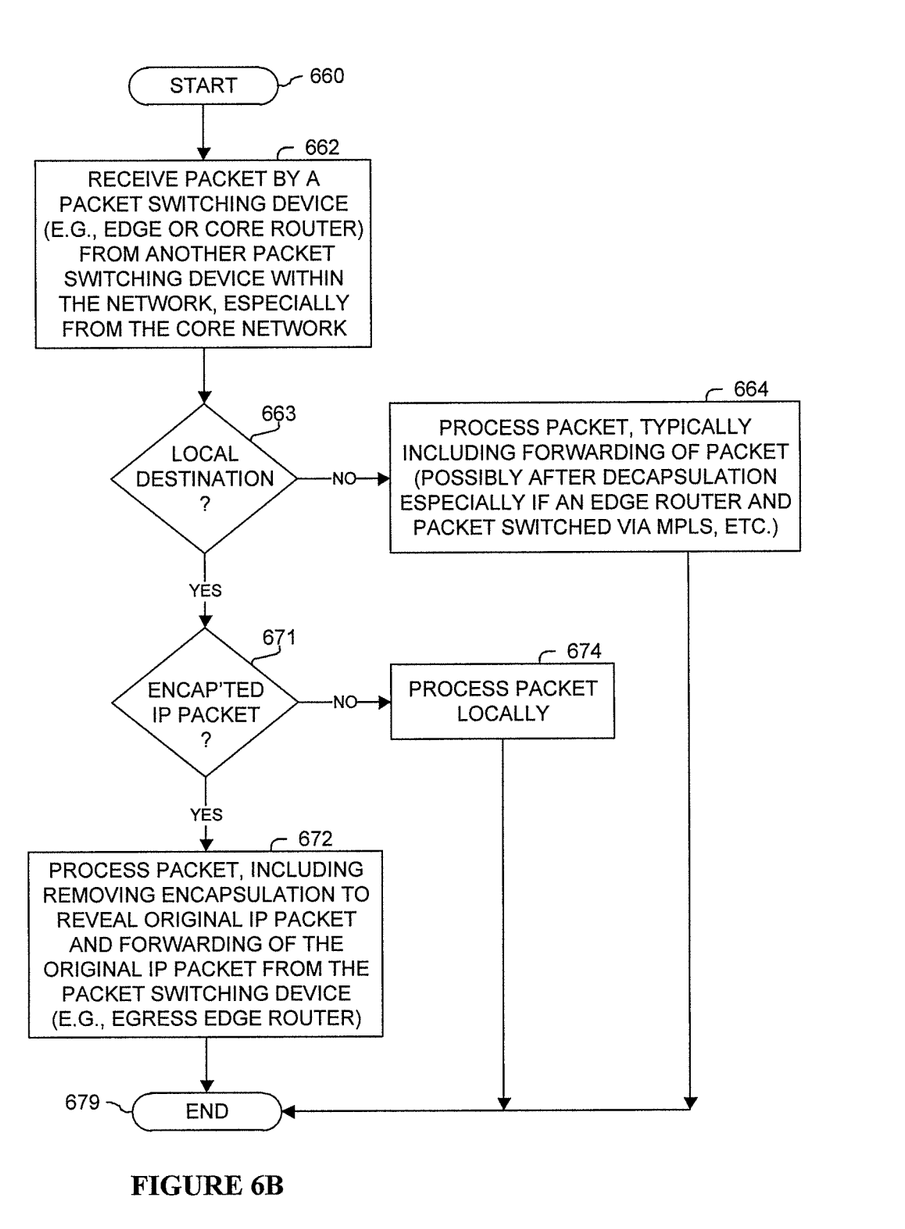
FIG. 6B illustrates a process configured to be performed, and/or performed, in one embodiment.

FIG. 6B illustrates a process configured to be performed and/or performed in one embodiment by a networked packet switching device. Processing begins with process block 660. In process block 662, a packet is received by a packet switching device from another packet switching device within the network, such as, but not limited to an edge or core packet switching device receiving the packet from an edge or core packet switching device. As determined in process block 663, if the packet is not addressed for the packet switching device (i.e., the packet switching device that received the packet), then the packet is processed in process block 664, which typically includes forwarding of the received packet or a decapsulated packet within the received packet. For example in one embodiment, if a MPLS packet is received by an edge packet switching device, the edge packet switching device will typically remove the MPLS encapsulation and forward the revealed packet. For example in one embodiment, if a core packet switching device receives a packet, it will typically forward the received packet (possibly after removing or updating a label if it is a MPLS packet).

Otherwise, the packet is addressed to the receiving packet switching device as determined in process block 663. Next, as determined in process block 671, if the received packet is an encapsulated IP packet (e.g., in one embodiment, the received packet includes an IP tunnel header; in one embodiment, the received packet includes a protocol type of IP in IP), then, in process block 672, the received IP packet is processed, including removing the IP encapsulation such as to expose the encapsulated IP packet, which is then forwarded from the packet switching device.

In one embodiment, this revealed encapsulated IP packet is an IP packet originally received and encapsulated by another edge packet switching device in the network (e.g., as described in relation to process block 616 of FIG. 6A). In one embodiment, an edge packet switching device is performing the operations described in FIG. 6B. Thus, one embodiment significantly reduces the number of IP addresses required for forwarding packets through the network by encapsulating received IP packets in an IP packet having an address of another packet switching device in the network. Thus in one embodiment, packet switching devices within the core of the network switch IP packets based substantially only on IP addresses of packet switching devices (e.g., core and edge) within the network. This greatly reduces the number of routes that need to be installed in a forwarding information base (FIB) of a core router of one embodiment.

Otherwise, as determined in process block 671, the packet is actually destined for the receiving packet switching device (e.g., a routing update packet for the packet switching device), and the packet is processed locally in process block 674.

Processing of the flow diagram of FIG. 6B is complete as indicated by process block 679.

Figure 7:
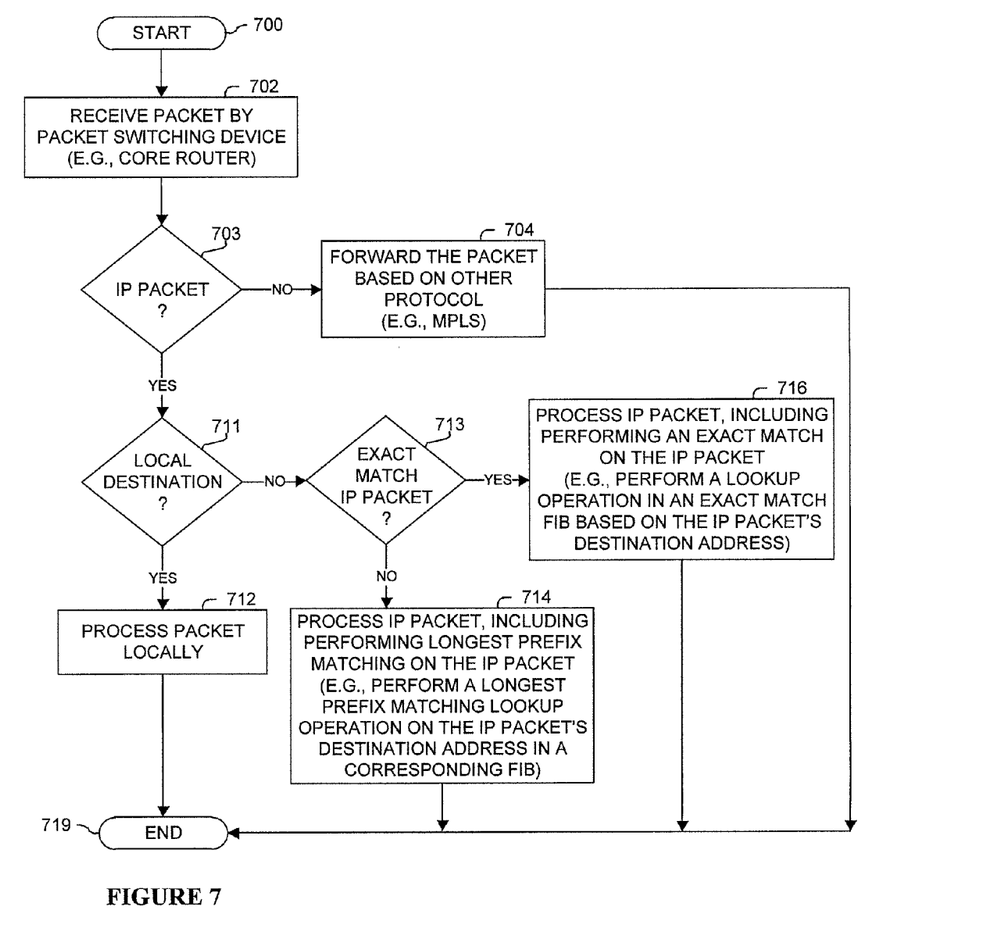
FIG. 7 illustrates a process configured to be performed, and/or performed, in one embodiment.

FIG. 7 illustrates a process configured to be performed and/or performed in one embodiment by a packet switching device, especially a core packet switching device. Processing begins with process block 700. In process block 702, an packet is received by the core packet switching device from another packet switching device (e.g., core or edge router) in the network. As determined in process block 703, if the received packet is not an IP packet, then the packet is processed including forwarding based on the other protocol (e.g., MPLS) in process block 704.

Otherwise, if it was determined in process block 703 that the received packet is an IP packet, then as determined in process block 711, if the packet is destined for the packet switching device, the packet is processed locally in process block 712.

Otherwise, if it was determined in process block 711 that the packet is not destined for the packet switching device, then, as determined in process block 713, if a lookup operation on the received IP packet should be an exact match lookup operation, then in process block 716, the packet is processed including an exact matching operation being performed in an exact matching FIB based on the destination address of the received IP packet. Otherwise, in process block 714, the received IP packet is processed, including performing a longest prefix matching operation in a longest prefix matching FIB based on the destination address of the received IP packet.

Processing of the flow diagram of FIG. 7 is complete as indicated by process block 719.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be altered and/or re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A network, comprising:
a core network, including a plurality of core packet switching devices, with each of the plurality of core packet switching devices configured to perform operations; and
a plurality of edge packet switching devices, with each of the plurality of edge packet switching devices configured to perform operations, including communicating packets with the core network, and with one or more external networks or devices;
wherein said configuration of each of the plurality of core packet switching devices and said configuration of each of the plurality of edge packet switching devices includes exchanging Internet Protocol (IP) routing information in a manner to distribute said IP routing information among the plurality of core packet switching devices and the plurality of edge packet switching devices; and
wherein said configuration of each particular core packet switching device of the plurality of core packet switching devices includes:
maintaining said IP routing information;
filtering said IP routing information to produce a significantly fewer number of IP routes than the number IP routes in said IP routing information and installing said significantly fewer number of IP routes in one or more forwarding information bases (FIBs) within the particular core packet switching device, wherein said installed IP routes include a plurality of IP routes respectively corresponding to each of the plurality of core packet switching devices and each of the plurality of edge devices; and
forwarding packets, based on said one or more FIBs within the particular core packet switching device, to other packet switching devices of the plurality of core packet switching devices and the plurality of edge packet switching devices;
wherein an IP route is an IP address that is a fully or partially expanded prefix, not a path.

2. The network of claim 1, wherein said configuration of the each of the plurality of edge packet switching devices includes:
performing a lookup operation on a destination address of a received Internet Protocol (IP) packet to determine an IP address of a different edge packet switching device of the plurality of edge packet switching devices;
encapsulating the received packet in an encapsulating IP packet having an IP destination address of the IP address of the different edge packet switching device; and
sending the encapsulating IP packet to a neighboring core router of the plurality of core routers on the way to the different edge packet switching device.

3. The network of claim 2, wherein the IP address of the different edge packet switching device is a loopback address of the different edge packet switching device.

4. The network of claim 2, wherein said exchanging of IP routing information includes exchanging marked routing protocol packets including IP routing information for one or more IP routes, with said marking identifying for certain particular routes of said one or more IP routes of said exchanged marked routing protocol packets that the corresponding one or more routes must be installed, and with said marking identifying for certain routing information of said exchanged marked routing protocol packets that the corresponding one or more routes are not required to be installed.

5. The network of claim 4, wherein said routing protocol packets are an Interior Gateway Protocol (IGP) or Border Gateway Protocol (BGP) packets.

6. The network of claim 5, wherein said marking identifying for certain particular routes of said one or more IP routes of said exchanged marked routing protocol packets that the corresponding routes must be installed is included in a corresponding extension to said IGP or BGP packets.

7. The network of claim 4, wherein said one or more FIBs, in each identifiable core packet switching device of the plurality of core packet switching devices, includes an exact match FIB and a longest prefix matching FIB; and
wherein said configuration of each of the plurality of core packet switching devices includes:
installing, in the exact match FIB, said routes that must be installed per said corresponding marking;
performing only exact, not longest prefix matches, on the exact match FIB;
installing, in the longest prefix matching FIB, said routes that are not required to be installed per said corresponding marking; and
performing lookup operations on the longest prefix matching FIB.

8. The network of claim 7, wherein said configuration of each of the plurality of core packet switching devices includes:
determining, based on one or more fields of a received first particular packet, to perform a lookup operation in the exact match FIB, and in response, to perform a lookup operation in the exact match FIB to determine how to forward the first particular packet; and
determining, based on one or more fields of a received second particular packet, to perform a lookup operation in the longest prefix matching FIB, and in response, to perform a lookup operation in the exact match FIB to determine how to forward the second particular packet.

9. The network of claim 4, wherein said one or more FIBs, in each identifiable core packet switching device of the plurality of core packet switching devices, includes an exact match FIB and a longest prefix matching FIB; and
wherein said configuration of each of the plurality of core packet switching devices includes:
installing, in the exact match FIB, less than all bits of said routes that must be installed per said corresponding marking;
performing only exact, not longest prefix matches, on the exact match FIB;
installing, in the longest prefix matching FIB, said routes that are not required to be installed per said corresponding marking; and
performing lookup operations on the longest prefix matching FIB.

10. The network of claim 9, wherein said reference to IP is a reference to IPv6.

11. The network of claim 1, wherein said installed IP routes consist of the plurality of IP routes respectively corresponding to each of the plurality of core packet switching devices and each of the plurality of edge devices.

12. The network of claim 1, wherein the number of said installed IP routes is on the order of magnitude of the sum of the number of the plurality of core packet switching devices and the number of the plurality of edge devices.

13. The network of claim 1, wherein the number of said installed IP routes is at least one order of magnitude less than the number of routes in said IP routing information said filtered to produce the significantly fewer number of IP routes that are installed in one or more forwarding information bases (FIBs) within the particular core packet switching device.

14. A particular packet switching device, comprising:
one or more processing elements;
memory;
a plurality of interfaces configured to send and receive packets; and
one or more packet switching mechanisms configured to packet switch packets among said interfaces;
wherein said one or more processing elements are configured to perform operations, including:
exchanging Internet Protocol (IP) routing information with other devices in a particular network, with the particular network including a plurality of other core packet switching devices and a plurality of edge packet switching devices;
maintaining said IP routing information;
filtering said IP routing information to produce a significantly fewer number of IP routes than the number IP routes in said IP routing information and installing said significantly fewer number of IP routes in one or more forwarding information bases (FIBs) within the particular packet switching device, wherein said installed IP routes include a plurality of IP routes respectively corresponding to each of the plurality of core packet switching devices and each of the plurality of edge devices; and
forwarding packets, based on said one or more FIBs within the particular packet switching device, to other packet switching devices of the plurality of core packet switching devices and the plurality of edge packet switching devices;
wherein an IP route is an IP address that is a fully or partially expanded prefix, not a path.

15. The particular packet switching device of claim 14, wherein said exchanging of IP routing information includes exchanging marked routing protocol packets including IP routing information for one or more IP routes, with said marking identifying for certain particular routes of said one or more IP routes of said exchanged marked routing protocol packets that the corresponding one or more routes must be installed, and with said marking identifying for certain routing information of said exchanged marked routing protocol packets that the corresponding one or more routes are not required to be installed.

16. The particular packet switching device of claim 14, wherein said one or more FIBs includes an exact match FIB and a longest prefix matching FIB; and
wherein said operations include:
installing, in the exact match FIB, routes within the particular network; and
installing, in the longest prefix matching FIB, routes external to the particular network.

17. The particular packet switching device of claim 16, wherein the particular packet switching device includes a particular physical device including: at least one of said one or more processing elements configured to perform lookup operations on the exact match FIB; and memory configured to store the exact match FIB; and
wherein the particular packet switching device includes, external to the particular physical device: one or more memories or longest prefix matching devices including the longest prefix matching FIB.

18. A method, comprising:
performing operations by a particular packet switching device, with said operations comprising:
exchanging Internet Protocol (IP) routing information with other devices in a particular network, with the particular network including a plurality of other core packet switching devices and a plurality of edge packet switching devices;
maintaining said IP routing information;
filtering said IP routing information to produce a significantly fewer number of IP routes than the number IP routes in said IP routing information and installing said significantly fewer number of IP routes in one one or more forwarding information bases (FIBs) within the particular packet switching device, wherein said installed IP routes include a plurality of IP routes respectively corresponding to each of the plurality of core packet switching devices and each of the plurality of edge devices; and
forwarding packets, based on said one or more FIBs within the particular packet switching device, to other packet switching devices of the plurality of core packet switching devices and the plurality of edge packet switching devices;
wherein an IP route is an IP address that is a fully or partially expanded prefix, not a path.

19. The method of claim 18, wherein said one or more FIBs includes an exact match FIB and a longest prefix matching FIB; and wherein said operations include:
installing, in the exact match FIB, routes within the particular network; and
installing, in the longest prefix matching FIB, routes external to the particular network.

20. The method of claim 19, wherein said operations include:
determining, based on one or more fields of a received first particular packet, to perform a lookup operation in the exact match FIB, and in response, to perform a lookup operation in the exact match FIB to determine how to forward the first particular packet; and
determining, based on one or more fields of a received second particular packet, to perform a lookup operation in the longest prefix matching FIB, and in response, to perform a lookup operation in the exact match FIB to determine how to forward the second particular packet.

* * * * *